(12) United States Patent
Wijning et al.

(10) Patent No.: US 11,346,166 B2
(45) Date of Patent: May 31, 2022

(54) SEMI-SUBMERSIBLE DRILLING VESSEL WITH A MUD TREATMENT AND CIRCULATION SYSTEM

(71) Applicant: ITREC B.V., Schiedam (NL)

(72) Inventors: Diederick Bernardus Wijning, Schiedam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 460 days.

(21) Appl. No.: 16/491,254

(22) PCT Filed: Mar. 6, 2018

(86) PCT No.: PCT/NL2018/050136
§ 371 (c)(1),
(2) Date: Sep. 5, 2019

(87) PCT Pub. No.: WO2018/164572
PCT Pub. Date: Sep. 13, 2018

(65) Prior Publication Data
US 2020/0011143 A1    Jan. 9, 2020

(30) Foreign Application Priority Data

Mar. 6, 2017 (NL) ...................................... 2018472

(51) Int. Cl.
*E21B 21/06* (2006.01)
*B01D 19/00* (2006.01)
(Continued)

(52) U.S. Cl.
CPC ........ *E21B 21/067* (2013.01); *B01D 19/0036* (2013.01); *B01D 21/283* (2013.01);
(Continued)

(58) Field of Classification Search
CPC ...... E21B 21/067; E21B 21/001; E21B 15/02; E21B 21/01; B01D 19/0036;
(Continued)

(56) References Cited

U.S. PATENT DOCUMENTS 2,748,884 A  *  6/1956  Erwin .................... E21B 21/067
                                              96/198
2013/0284447 A1   10/2013  Olsen et al.
(Continued)

FOREIGN PATENT DOCUMENTS

WO      WO 2015/039667 A2    3/2015
WO      WO-2016144163 A1 *   9/2016  ........... F01N 13/004

OTHER PUBLICATIONS

Andersson et al., "Flush Drill Floor, A conceptual design that lowers the vertical center of gravity on semi-submersible offshore drilling rigs", Chalmers University of Technology, Göteborg, Sweden, Sep. 16. 2014. Report No. E2014:019, XP055425535, URL: http://publications.lib.chalmers.se/records/fulltext/202824/202824.pdf, total 102 pages.
(Continued)

*Primary Examiner* — Abby J Flynn
*Assistant Examiner* — Yanick A Akaragwe
(74) *Attorney, Agent, or Firm* — Birch, Stewart, Kolasch & Birch, LLP

(57) ABSTRACT

A semi-submersible drilling vessel has a deckbox structure and a shaker room. A downward sloping mud return line is provided that passes mud from the diverter to the shaker room. In the shaker room there are one or more shale shaker devices, one or more upstream mud tanks arranged to receive gas cut mud from the one or more shale shaker devices, and a vacuum degasser having an inlet pipe extending into an upstream mud tank, a vacuum tank, a vacuum pump, and an outlet, and a degassed mud tank receiving
(Continued)

degassed mud from the outlet of the vacuum degasser. The degassed mud tank has an effective height between the bottom thereof to the operational mud level in said degassed mud tank that is greater than the corresponding effective height of said one or more upstream mud tanks. The degassed mud tank is mounted so that—in operation—the operational mud level in said degassed mud tank is at least 1.5 meter, preferably at least 2 meters, higher than in said one or more upstream tanks with the vacuum degassers self-suction effect causing the mud to be pumped from the upstream tank, via the vacuum degasser, into the degassed mud tank.

7 Claims, 2 Drawing Sheets

(51) Int. Cl.
 *B01D 21/28* (2006.01)
 *B63B 35/34* (2006.01)
 *B63B 35/44* (2006.01)
 *E21B 21/00* (2006.01)

(52) U.S. Cl.
 CPC .......... *B63B 35/34* (2013.01); *B63B 35/4413* (2013.01); *B63B 2035/442* (2013.01); *E21B 21/001* (2013.01)

(58) Field of Classification Search
 CPC ... B01D 21/283; B63B 35/34; B63B 35/4413; B63B 2035/442; B63B 2003/147; B63B 1/107
 See application file for complete search history.

(56) References Cited

U.S. PATENT DOCUMENTS

2015/0183495 A1 7/2015 Chiu et al.
2015/0284811 A1* 10/2015 Knight ................ C12Q 1/6888
 506/2

OTHER PUBLICATIONS

International Search Report, issued in PCT/NL2018/050136, dated May 30, 2018.
Written Opinion of the International Searching Authority, issued in PCT/NL2018/050136, dated May 30. 2018.

* cited by examiner

SEMI-SUBMERSIBLE DRILLING VESSEL WITH A MUD TREATMENT AND CIRCULATION SYSTEM

FIELD OF THE INVENTION

The present invention relates to a semi-submersible drilling vessel. Such a vessel commonly has a deckbox structure, one or more pontoons, e.g. two parallel pontoons or a ring pontoon, and multiple support columns extending upward from the one or more pontoons and supporting thereon the deckbox structure.

The deckbox structure has an upper deck and a box bottom, with the box bottom being located at a height to provide an air gap between a highest wave crest and the box bottom of the deckbox structure. Herein the highest wave crest is related to sea conditions for the location and time of year where the vessel is operated.

The vessel also has a moonpool extending through the deckbox structure and a drilling installation with a drilling tower erected above the upper deck of the deckbox structure and adapted to perform drilling operations along one or multiple firing lines through the moonpool.

BACKGROUND OF THE INVENTION

In known embodiments of the so-called flush deck design the semi-submersible vessel has a drill floor at the top end of the moonpool, wherein the drill floor is at the same level as the upper deck of the deckbox structure, e.g. allowing for (skid) rails to extend across the upper deck and continue on the drill floor for the transportation of drilling related equipment between a remote storage position and a position on the drill floor and/or aligned with the one or more firing lines.

The present invention relates to the problem of incorporating the mud treatment and circulation system in the deckbox structure of the semi-submersible drilling vessel.

Reference is made in this regard to the Andersson et al. document "Flush Drill Floor, A conceptual design that lowers the vertical center of gravity on semi-submersible offshore drilling rigs", Chalmers University of Technology, Joakim Andersson & Mikael Ahlstedt, Goteborg, Sweden, 2014, Report No. E2014:019.
URL: http://publications.lib.chalmers.se/records/fulltext/202824/202824.pdf As discussed in said Andersson et al. document the flush deck design places significant constraints on the layout of the mud treatment and circulation system as, compared to known designs where the drill floor is elevated above the upper deck, e.g. by some 10 meters, the available height within the deckbox structure is limited. Lowering the box bottom of the deckbox in order to increase height within the deckbox structure reduces the air gap, which reduces the operational window of the vessel. Keeping the box bottom at a certain height and raising the upper deck of the deckbox structure, and thus everything mounted on the upper deck, in order to increase the height within the deckbox structure significantly impacts the stability of the vessel.

In the Andersson et al. document the drilling installation comprises a diverter arranged in the moonpool below the drill floor. The diverter connects via a downward sloping mud return line to a mud treatment and circulation system. Within the deckbox structure, adjacent the moonpool, there is a shaker room and the mud passes by gravity via the downward sloping mud return line from the diverter to the shaker room. In the shaker room there are provided:

one or more shale shaker devices,
one or more upstream mud tanks arranged to receive gas cut mud from the one or more shale shaker devices, e.g. one or more sand trap tanks,
a vacuum degasser having an inlet pipe extending into an upstream mud tank, a vacuum tank, a vacuum pump, and an outlet, and
a degassed mud tank receiving degassed mud from the outlet of the vacuum degasser.

The mud treatment and circulation system further comprises, within the deckbox structure:
one or more active mud tanks,
one or more mud pumps having inlets connected to the one or more active mud tanks, As part of the flush deck design in the Andersson et al. document the upper deck of the deckbox structure, at least the portion thereof above the shaker room and the active mud tanks, is at the same level as the drill floor.

In order to fit the mud treatment and circulation system Andersson et al. mentions a number of design choices which include placing the tanks of the system either on the lower deck of the deck box or even directly on the box bottom, and includes providing a low depth design of the upstream tanks, degassed mud receiving tank, and active mud tanks. As a result of the shallow design of the tanks, including the active tanks, in Andersson et al. the floor area occupied by the system is significantly greater than in non-flush deck vessel designs where more height is available to accommodate the mud treatment and circulation system.

OBJECT OF THE INVENTION

The present invention aims to provide an improved semi-submersible vessel, in particular with respect to the mud treatment and circulation system thereof, e.g. said improvement allowing for a flush deck design to be combined with an optimal air gap of the deckbox structure and with an optimal use of floor area occupied by the mud treatment system.

SUMMARY OF THE INVENTION

The invention provides a semi-submersible drilling vessel according to claim 1. Herein the degassed mud tank receiving degassed mud from the vacuum degasser has an effective height between the bottom thereof to the operational mud level in the degassed mud tank that is greater than the corresponding effective height of the one or more upstream mud tanks. The degassed mud tank is mounted so that, in operation, the operational mud level in the degassed mud tank is at least 1.5 meter, preferably at least 2 meters, e.g. between 2 and 3 meters, higher than in the one or more upstream tanks with the vacuum degassers self-suction effect causing the mud to be pumped from the upstream tank, via the vacuum degasser, into the degassed mud tank.

The mud degasser can be of any suitable design, e.g. a horizontal vacuum tank type mud degasser, e.g. a Swaco D-Gasser (trademark), wherein a thin sheet of mud flows from a horizontal pool over one or more sloping baffle plates arranged inside the vacuum tank. Or the mud degasser can be as a vertical vacuum tank type mud degasser. In embodiments the mud degasser comprises a vacuum pump to evacuate the tank of the degasser. In embodiments the mud degasser comprises an eductor device at the outlet of the tank, the eductor device being fed with a jet of degassed mud that causes a vacuum that removes mud from the vacuum tank.

The invention envisages in an embodiment that the one or more active mud tanks have an operational mud level that is the same as that of the degassed mud tank into which the vacuum degasser discharges the degassed mud.

Preferably the deckbox structure has a lower deck above the box bottom, with the framework of the lower deck in between, and the upstream tanks, degassed mud tank, active mud tanks, and any tanks intermediate the degassed mud tank and the active mud tanks being arranged with their bottom on the lower deck. This keeps the bottoms of these tanks away from the very box bottom. At the same time optimal use is then made of the available height within the deckbox for the storage of mud in these tanks, thereby reducing floor area requirements.

The invention also relates to a method for drilling a subsea wellbore wherein use is made of a semi-submersible vessel as described herein.

The invention also relates to a method for drilling a subsea wellbore wherein use is made of a semi-submersible vessel as described herein, wherein during drilling mud is circulated, and wherein the vacuum degasser sucks mud from the one or more upstream tanks into the vacuum tank and discharges degassed mud via the outlet into the degassed mud tank, wherein the degassed mud tank receiving degassed mud from said vacuum degasser has an effective height between the bottom thereof to the operational mud level in said degassed mud tank that is greater than the corresponding effective height h of said one or more upstream mud tanks, and the operational mud level in said degassed mud tank is at least 1.5 meter, preferably at least 2 meters, higher than in said one or more upstream tanks with the vacuum degassers self-suction effect causing the mud to be pumped from the upstream tank, via the vacuum degasser, into the degassed mud tank.

The invention will now be explained with reference to the drawings.

DETAILED DESCRIPTION OF EMBODIMENTS

Figure 1:
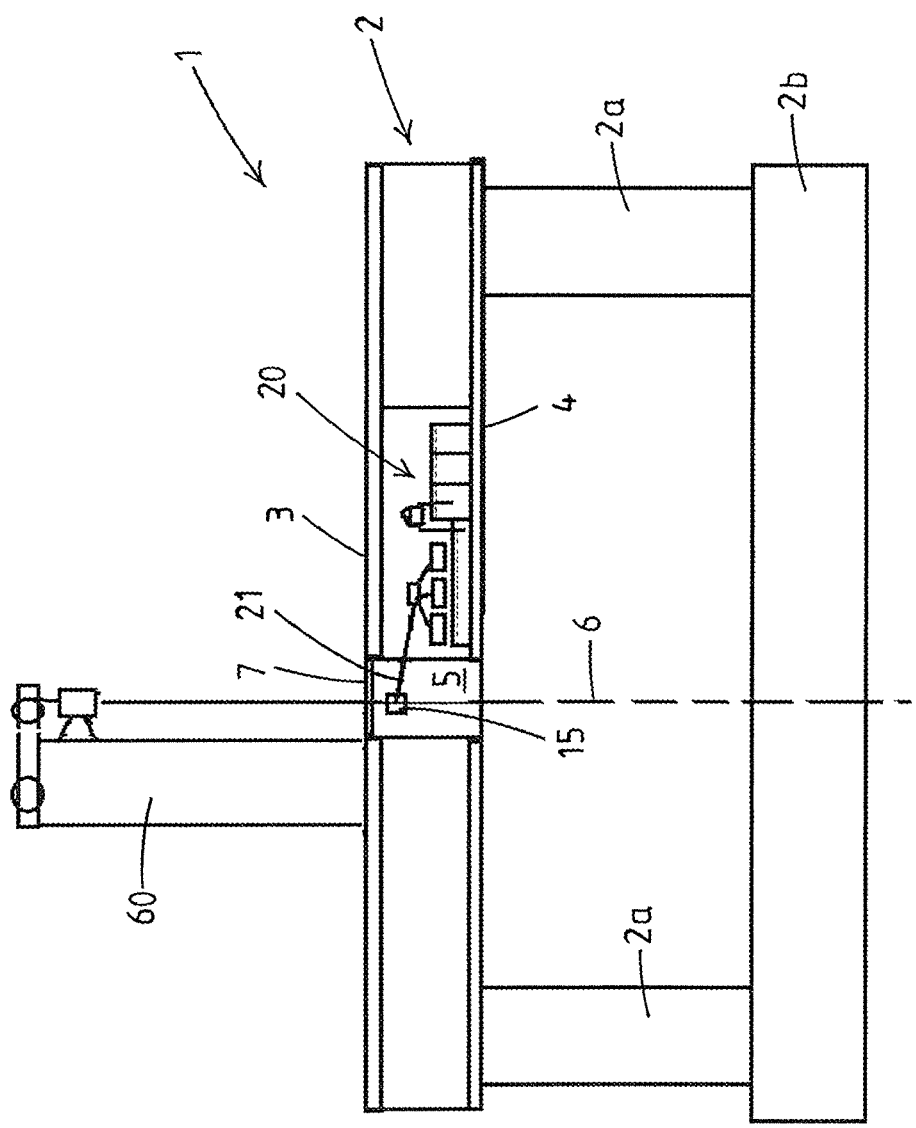
FIG. 1 shows schematically an example of a semi-submersible drilling vessel of the invention.

As is commonly known a semi-submersible drilling vessel 1 has a deckbox structure 2 that is supported via multiple support columns 2a on one or more pontoons 2b, e.g. two parallel pontoons or a ring pontoon. The support columns 2a extend upward from the one or more pontoons 2b and support thereon the deckbox structure 2.

The deckbox structure 2 has an upper deck 3 and a box bottom 4. For example, in practical embodiments, the vertical spacing between these upper and bottom faces of the deckbox structure is between 8.5 and 11 meters.

In the total design of the vessel the box bottom 4 is located at a height that provides an air gap between a predicted highest wave crest and the box bottom 4 of the deckbox structure.

It can be seen that the deckbox structure has a lower deck 9 spaced above the box bottom 4, with the framework of the lower deck 9 in between.

The figures show part of a moonpool 5 that extends vertically through the deckbox structure 2.

The vessel comprises a drilling installation with a drilling tower 60, e.g. a derrick over the moonpool or a mast 60 having an associated drawworks with a firing line 6 along an outer contour of the mast. The drilling tower 60 is erected above the upper deck 3 of the deckbox structure 2. The drilling installation is adapted to perform drilling operations along one or multiple firing lines 6 through the moonpool 5.

The figures depict a drill floor 7 at the top end of the moonpool 5, and flush with the adjacent upper deck 3 of the deckbox structure 2. For example, as depicted here, one or more rails 8 extend over the upper deck 3 onto the drill floor 7, e.g. for transportation of drilling equipment onto the drill floor, e.g. into the firing line 6. For example the transportation is done by skidding, using skiddable transporters.

In embodiments the drill floor 7 is mobile, e.g. vertically mobile, tiltable, or slidable in a horizontal plane, e.g. to allow for the passage of large items, e.g. a BOP into and out of the moonpool 5. For example, in an embodiment, the drill floor is mounted on a set of vertically arranged hydraulic cylinders that allow for vertical motion of the drill floor between a lower position, flush with the upper deck 3, and an elevated position, e.g. the latter allowing for passage of a tall BOP between a storage position thereof and a position aligned with a firing line, so underneath the elevated drill floor. In an embodiment drilling is done with the drill floor stationary in its lower position. In yet another embodiment the hydraulic cylinders are embodied to allow the drill floor to perform a heave compensation motion relative to the deckbox structure.

In this example one or more mobile slip devices 12, 13 are arranged underneath the drill floor 7, each slip device 12, 13 being adapted to clamp onto a drilling tubulars string 14 in the firing line, e.g. in view of make-up and/or break up of the string 14. In this example the slip devices 12, 13 are horizontally movable between a storage position, as shown here, and an active position aligned with the firing line 6.

The drilling installation comprises a diverter 15 that is arranged in the moonpool 5 below the drill floor 7; here below the one or more slip devices 12, 13. The diverter 15 may be suspended from the drill floor 7.

The vessel 1 is provided with a mud treatment and circulation system. The figures schematically show a shaker room 20 near to the moonpool 5. This shaker room 20 is provided in the deckbox structure, and the upper deck 3 above this shaker room 20 is flush with the drill floor 7.

A downward sloping mud return line 21 is provided that passes, by gravity, mud from the diverter 15 to the shaker room 20.

In the shaker room 20 a distributor 22 is provided for the mud emerging from the line 21, which distributor 22 distributes the mud to be treated to multiple shale shaker devices 23, 24, 25. Also depicted is a low depth upstream mud tank 28 that is arranged to receive gas cut mud, so mud containing gas as it emerges from the wellbore, from the shale shaker devices 23, 24, 25. One or more of these upstream tanks, e.g. each upstream tank, can be embodied as a sand trap tank as is known in the art.

As preferred the tank 28 has a bottom on the lower deck floor 9 of the deckbox structure 2, so vertically spaced above the box bottom 4.

Also depicted are a vertical tank type vacuum degasser 30 having an inlet pipe 31 extending into upstream mud tank 28, a vacuum tank 32, a vacuum pump 33, and an outlet 34 for degassed mud.

Figure 2:
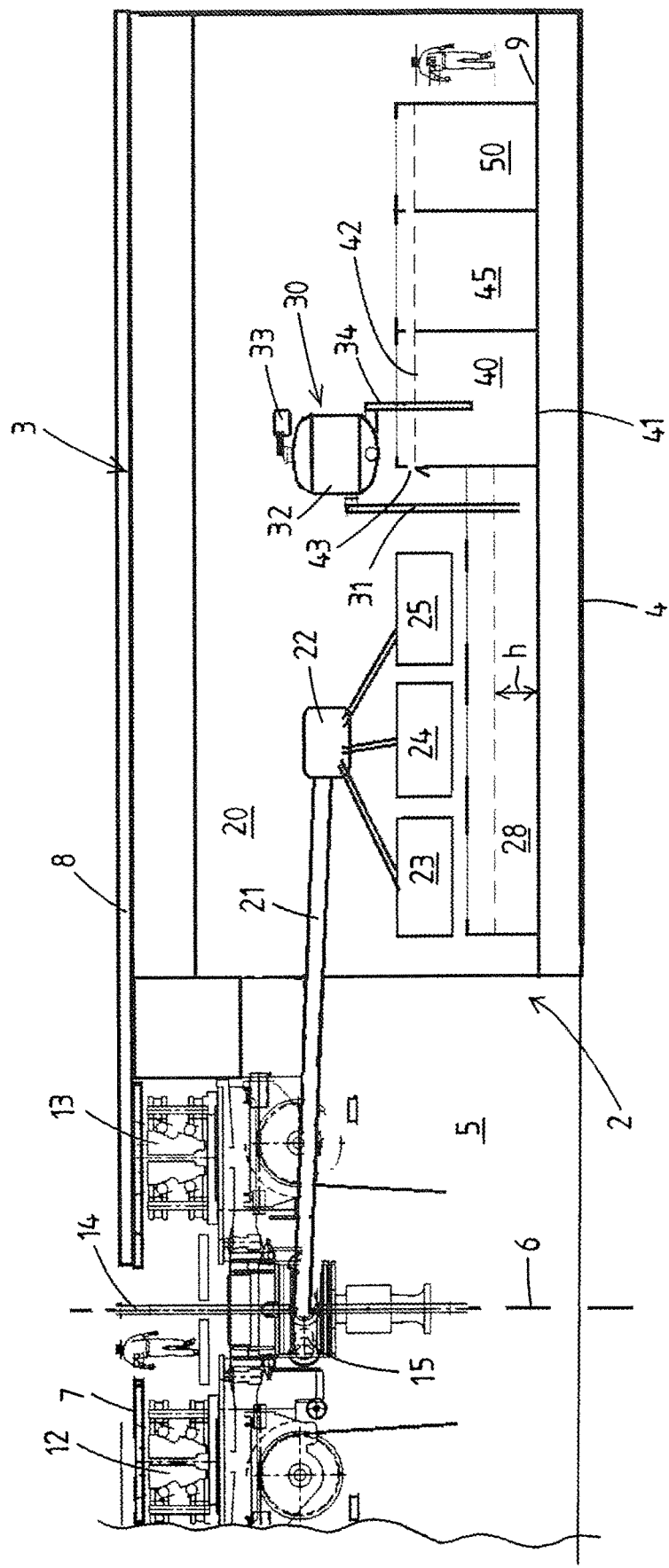
FIG. 2 shows schematically a cross-section of the deckbox structure of the semi-submersible drilling vessel of FIG. 1.

The FIG. 2 shows degassed mud tank 40 that receives degassed mud from the outlet 34 of the vacuum degasser 30.

The depicted mud treatment and circulation system further comprises, within the deckbox structure, one or more intermediate mud treatment tanks 45, e.g. for desanding and/or desilting the mud, and one or more active mud tanks 50 that basically serve as an inline storage of mud that is ready to be used for the drilling process. Not depicted here are the one or more mud pumps having inlets connected to the one or more active mud tanks 50. The vessel may further be provided with mud reserve tanks, e.g. in the deckbox structure or at another location, e.g. within one or more support columns and/or pontoons.

As schematically depicted the upper deck 3 of the deckbox structure, at least the portion thereof above the shaker room 20 and the active mud tanks 50 (which may be outside of the shaker room), is at the same level as the drill floor 7. As the shaker room 20 is close to the moonpool 5 it is highly advantageous to have the flush deck design at least in this area of the upper deck 3 that is adjacent the moonpool 5.

As can be seen in the FIG. 2 the degassed mud tank 40 receiving degassed mud from the vacuum degasser 30 has an effective height between the bottom 41 thereof to the operational mud level 42 in the degassed mud tank 40 that is greater than the corresponding effective height "h" of the one or more upstream mud tanks 28. For example the effective height of the tank 40 is at least 1.5 meter, preferably at least 2 meter, more than the height "h" of tank 28 that receives the gas containing mud from the one or more shale shaker devices.

In embodiments the operational mud level in the mud tank 40, and preferably also in downstream tanks, is determined by one or more overflow devices. For example an overflow device 43 sets the operational mud level in tank 40 and communicating tanks 45, 50, by allowing for overflow of degassed mud back into an upstream tank 28 as illustrated in FIG. 2.

The degassed mud tank 40, here mounted on the same lower deck floor 9 as the tank or tanks 28, is mounted so that, in operation, the operational mud level 42 in the degassed mud tank 40 is at least 1.5 meter, preferably at least 2 meters, e.g. between 2 and 3 meters, higher than in the one or more upstream tanks 28. Herein the vacuum degassers self-suction effect causes the mud to be pumped via the inlet pipe out of the upstream tank 28, with the mud then passing through the vacuum degasser 30 and being degassed, and the degassed mud exiting the degasser 30 and entering into the degassed mud tank 40.

If desired, as depicted here, an overflow of mud from the tank 40 into the low depth upstream tank 28 can be present.

Preferably, as depicted here, any intermediate treatment tank 45 and the active tank 50 storing the degassed and treated mud, has an operation mud level that corresponds to the mud level 42 in tank 40.

One or more mud pumps, not depicted, have inlets connected to the one or more active mud tanks 50 and operate to pump the treated mud into the drilling process.

The one or more upstream tanks 28, the degassed mud tank 40, the one or more active mud tanks 50, and any tanks 45 intermediate the degassed mud tank and the active mud tanks are arranged with their bottom on or in proximity of the lower deck 9.

When drilling a subsea wellbore using the described semi-submersible vessel, in one or more stages of the drilling process, drilling mud is circulated. The vacuum degasser 30 sucks mud from the one or more upstream tanks 28 into the vacuum tank 32 and discharges degassed mud via the outlet 34 into degassed mud tank 40.

As explained already the degassed mud tank 40 receiving degassed mud from the vacuum degasser 30 has an effective height between the bottom 41 thereof to the operational mud level 42 in the degassed mud tank 40 that is greater than the corresponding effective height "h" of the one or more upstream mud tanks 28. As is preferred all upstream mud tanks have the same operational mud level therein during operation of the mud system. The operational mud level 42 in the degassed mud tank 40 is at least 1.5 meter, preferably at least 2 meters, higher than in the one or more upstream tanks 28 with the vacuum degasser's self-suction effect causing the mud to be pumped from the upstream tank 28, via the vacuum degasser 30, into the degassed mud tank 40.

The illustrated design of the mud system requires relatively little floor space within the deckbox structure.

The invention claimed is:

1. A semi-submersible drilling vessel, said vessel comprising:
   a deckbox structure;
   one or more pontoons; and
   multiple support columns extending upward from the one or more pontoons and supporting thereon the deckbox structure;
   wherein the deckbox structure has an upper deck and a box bottom, and wherein the deckbox structure has a moonpool extending through said deckbox structure,
   wherein the vessel comprises a drilling installation with a drilling tower erected above the upper deck of the deckbox structure and adapted to perform drilling operations along one or multiple firing lines through said moonpool,
   where said vessel has a drill floor,
   wherein said drilling installation comprises a diverter arranged in the moonpool below the drill floor,
   wherein the vessel is provided with a mud treatment and circulation system,
   wherein the vessel is provided with a shaker room within the deckbox structure and in proximity of the moonpool, wherein a mud return line, is provided that passes mud from the diverter to the shaker room,
   wherein the mud treatment and circulation system comprises, in said shaker room:
   one or more shale shaker devices;
   one or more upstream mud tanks arranged to receive gas cut mud from the one or more shale shaker devices;
   a vacuum degasser having an inlet pipe extending into an upstream mud tank, a vacuum tank, a vacuum pump, and an outlet, said vacuum degasser having a self-suction effect; and
   a degassed mud tank receiving degassed mud from the outlet of the vacuum degasser, said degassed mud tank having a bottom,
   wherein the mud treatment and circulation system further comprises, within the deckbox structure:
   one or more active mud tanks; and
   one or more mud pumps having inlets connected to the one or more active mud tanks,
   wherein the upper deck of the deckbox structure, at least a portion thereof above the shaker room is at the same level as the drill floor,
   wherein the degassed mud tank receiving degassed mud from said vacuum degasser has an effective height between the bottom thereof to an operational mud level in said degassed mud tank that is greater than a corresponding effective height of said one or more upstream mud tanks, and wherein the degassed mud tank is mounted so that, in operation, an operational mud level in said degassed mud tank is at least 1.5 meter higher than in said one or more upstream mud tanks with the vacuum degassers self-suction effect causing the mud to be pumped from the upstream mud tank, via the vacuum degasser, into the degassed mud tank.

2. The semi-submersible drilling vessel according to claim 1, wherein the one or more active mud tanks have an operational mud level that is the same as that of the degassed mud tank receiving degassed mud from the vacuum degasser outlet.

3. The semi-submersible drilling vessel according to claim 2, wherein the deckbox structure has a lower deck above the box bottom, with the framework of the lower deck in between, and wherein the one or more upstream mud tanks, the degassed mud tank, the one or more active mud tanks, and any tanks intermediate the degassed mud tank and the active mud tanks are arranged with their bottom on or in proximity of the lower deck.

4. The semi-submersible drilling vessel according to claim 1, wherein the deckbox structure has a lower deck above the box bottom, with the framework of the lower deck in between, and wherein the one or more upstream mud tanks, the degassed mud tank, the one or more active mud tanks, and any tanks intermediate the degassed mud tank and the active mud tanks are arranged with their bottom on or in proximity of the lower deck.

5. The semi-submersible drilling vessel according to claim 1, wherein the mud return line is a downward sloping mud return line that slopes down from the diverter to the shaker room.

6. The semi-submersible drilling vessel according to claim 1, wherein the degassed mud tank is mounted so that, in operation, an operational mud level in said degassed mud tank is at least 2 meters higher than in said one or more upstream mud tanks with the vacuum degassers self-suction effect causing the mud to be pumped from the upstream mud tank, via the vacuum degasser, into the degassed mud tank.

7. A method for drilling a subsea wellbore, comprising using the semi-submersible vessel according to claim 1, wherein during drilling, mud is circulated, and wherein the vacuum degasser sucks mud from the one or more upstream mud tanks into the vacuum tank and discharges degassed mud via the outlet into the degassed mud tank, wherein the degassed mud tank receiving degassed mud from said vacuum degasser has an effective height between the bottom thereof to the operational mud level in said degassed mud tank that is greater than the corresponding effective height of said one or more upstream mud tanks, and the operational mud level in said degassed mud tank is at least 1.5 meter higher than in said one or more upstream mud tanks with the vacuum degassers self-suction effect causing the mud to be pumped from the upstream mud tank, via the vacuum degasser, into the degassed mud tank.

* * * * *